Oct. 29, 1968 W. D. MITCHELL 3,407,587
DRIVING AND BRAKING OF TUBULAR STRANDERS
Filed May 17, 1966 4 Sheets-Sheet 1

INVENTOR
WILLIAM D. MITCHELL
BY
Mason, Mason & Albright
ATTORNEY

Oct. 29, 1968  W. D. MITCHELL  3,407,587
DRIVING AND BRAKING OF TUBULAR STRANDERS
Filed May 17, 1966  4 Sheets-Sheet 2

INVENTOR
WILLIAM D. MITCHELL
BY
Mason, Mason & Albright
ATTORNEYS

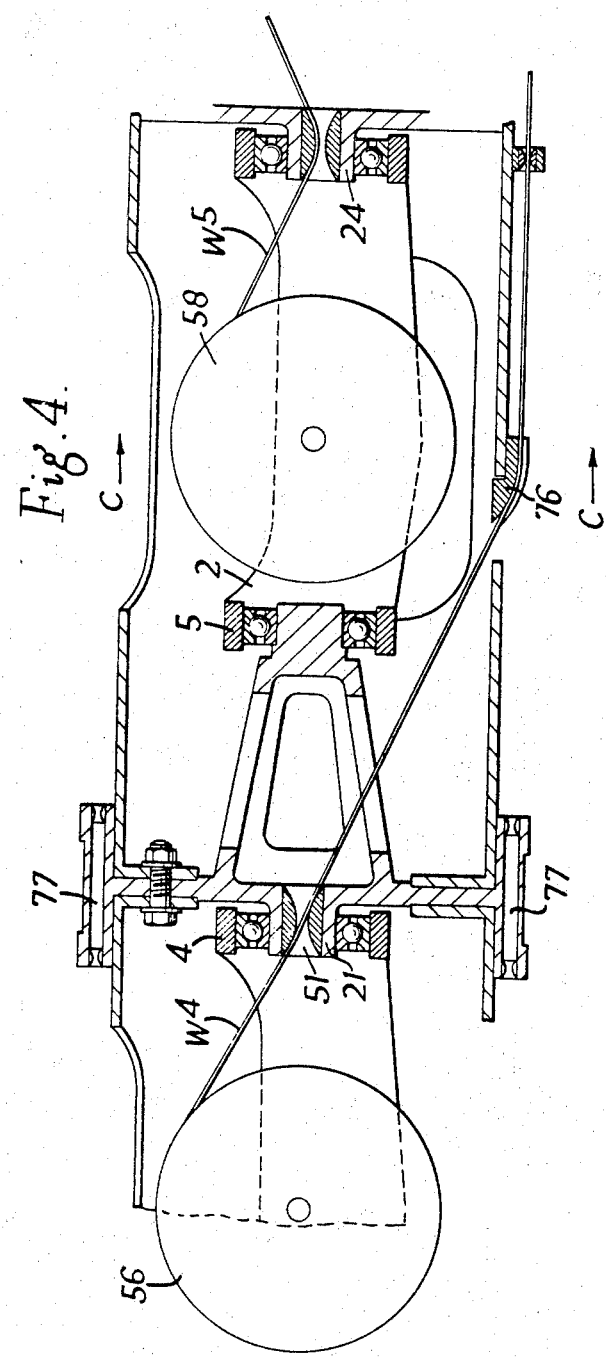

Oct. 29, 1968  W. D. MITCHELL  3,407,587
DRIVING AND BRAKING OF TUBULAR STRANDERS
Filed May 17, 1966  4 Sheets-Sheet 4

INVENTOR
WILLIAM D. MITCHELL
BY
Mason, Mason & Albright
ATTORNEYS

United States Patent Office 3,407,587
Patented Oct. 29, 1968

3,407,587
DRIVING AND BRAKING OF TUBULAR STRANDERS
William D. Mitchell, Rochester, Kent, England, assignor to Winget Limited, Rochester, Kent, England
Filed May 17, 1966, Ser. No. 550,695
15 Claims. (Cl. 57—58.32)

ABSTRACT OF THE DISCLOSURE

A strander with a rotatable tubular rotor has turnable pay-off reels and guides to lead the wires to a forming point outside the rotor at one end thereof. The reels are prevented from rotating relative to the ground. The rotor is driven by one or more electric motors which surround the rotor.

---

Known stranders are used for laying up wires into strands or strands into ropes, or wires into cables, the cables or ropes being made of various materials.

A tubular strander may comprise a rotor the length of which is much greater than its diameter and which contains freely supported cradles carrying wire to be stranded on reels, the object of the rotor being to carry the wires to a forming point whilst the wires are rotating around the pay-off reels.

During the operation of the machine, the cradles carrying the reels are stationary in relation to the ground, and the rotor revolves round them. Wire is fed from each reel to the centre of the rotor end and to the rotor wall and it is then passed along the rotor wall to the forming point. An additional reel may be mounted at the input end of the rotor, wire from the reel being fed to the forming point as in the case of wire from the enclosed reels. The rotor may be a solid or hollow-walled tube formed with ports, a series of small rotors connected together by bars or similar structures, or a series of small rotors connected together by a common drive. The rotor may be supported on under rollers or on anti-friction bearings spaced along the length of the rotor, depending upon the method of construction of the rotor.

The function of a tubular strander is to twist wires into a strand at the fastest rate possible. Other machines have the same function, but the tubular design is usually faster due to the small diameter of the rotating parts. The pay-off reels containing wire are mounted in line for the same reason, i.e. small diameter of rotating parts. The wires from the reels must pass to the nose of the machine in the straightest line possible, and in principle each wire follows a similar pattern to the others, except that the length of path varies from reel to reel. The tubular body should theoretically do no work on the wires except to rotate them round the floating reels, but in practice the wires must be deflected from the reel through the centre of the proceeding cradle supporting bearing, and deflected again at the tube periphery. The wires can pass down the tubular body either inside or outside the tube, but this is only a matter of convenience. If the wires are passed inside the tube the tubular body tends to be bigger in diameter and threading the wires tends to be more difficult. The advantages of inside threading include the reduction of wire guides down the length of the tubular body.

The whole function of the machine is to deliver the correct number of wires on a rotating pitch circle at the nose of the machine so that they can be twisted into a correctly formed strand or rope.

Three of the important functions of the drive to the rotor are:

(a) To accelerate the rotor and any other part of the machine normally driven by the rotor as quickly, smoothly and economically as possible; (b) to decelerate the rotor and associated parts in a very short time with consequent high torques exerted by a braking system; (c) to be able to jog or rotate the rotor at low speed for the purpose of setting up the machine.

The present method of driving the rotor of a tubular strander is generally by means of an electric motor independent of the rotor, the driving mechanism used being belts or gears connecting the motor to the rotor. The present method of braking or decelerating the rotor is by means of band brakes or disc brakes directly mounted on bands or discs in one or more positions along the rotor, such band brakes or disc brakes being operated electrically, mechanically, hydraulically, or pneumatically.

With the speeds encountered in stranding under present day conditions, increasing difficulty is being found in applying decelerating forces by means of friction brakes, and the time of acceleration of the rotor is longer than necessary, or the power unit required to accelerate quickly becomes uneconomical with normal external motor drives.

The object of the present invention therefore is to overcome these disadvantages and to this end the invention consists in a strander for laying-up wires into strands, or strands into ropes or wires into cables, of the kind comprising a rotatable tubular rotor and a plurality of longitudinally-spaced wire-carrying pay-off reels in reel-supporting cradles which are turnably supported in the body but are prevented from rotating in relation to the ground, means on or in the rotor for carrying and guiding the wires from the reels to a forming point whilst the wires are being wound off the reels, and means for rotating the rotor, the strander being characterised in that the rotor is driven by one or more electric motors which is or are designed so as to be part of and surround the rotor.

For accelerating and running purposes the motor or motors may be driven by direct current with the requisite controls or by alternating current by varying frequencies.

The braking effect may be obtained by direct current injection, by reversing current, or by regenerative braking or any other means of controlled deceleration of the rotors used. The electrical control should be such that only such motors on one strander rotor as are necessary need be used to maintain torque for accelerating, running, or braking at any stage of operation.

Each of the said pay-off reels may be rotatably mounted in a cradle which is turnably mounted within the rotor but is held against rotation in relation to the ground, for example by designing the cradle so that its centre of gravity is below the centre line of the bearings in which the cradle is supported.

One constructional embodiment of the invention comprises an input-reel turnably mounted at the input-end and externally of the rotor and carrying one of the wires which is to be stranded and which is guided into the interior of the rotor. After leaving the discharge end of the rotor the wires enter a forming point or die from which they pass onto a driven haul-off capstan and thence to a driven take-up drum, the forming point, the capstan and the drum all being arranged externally of the rotor.

In the same embodiment the wires are guided to the forming-point through guides arranged in the interior of the rotor and other guides arranged externally of the rotor, all the internal guides being coaxial with the rotor and some of the external guides being parallel with the axis of the rotor.

The rotor carries a plurality of angularly-spaced sets of wire guides externally of the rotor, each set comprising a plurality of angularly-spaced guides.

The or each motor comprises rotor windings which are carried by, and externally of, the rotor and stator windings which surround the rotor windings and are arranged in the fixed housing of the motor.

The or each motor preferably consists of a squirrel-cage motor.

One embodiment of the invention is shown, by way of example, in the accompanying drawings in which:

FIGURE 1 and FIGURE 1A are longitudinal sections of the machine;

FIGURE 4 is a sectional view on an enlarged scale showing part of the rotor centre bearing and one of the cradles with a reel mounted therein;

Figure 1:
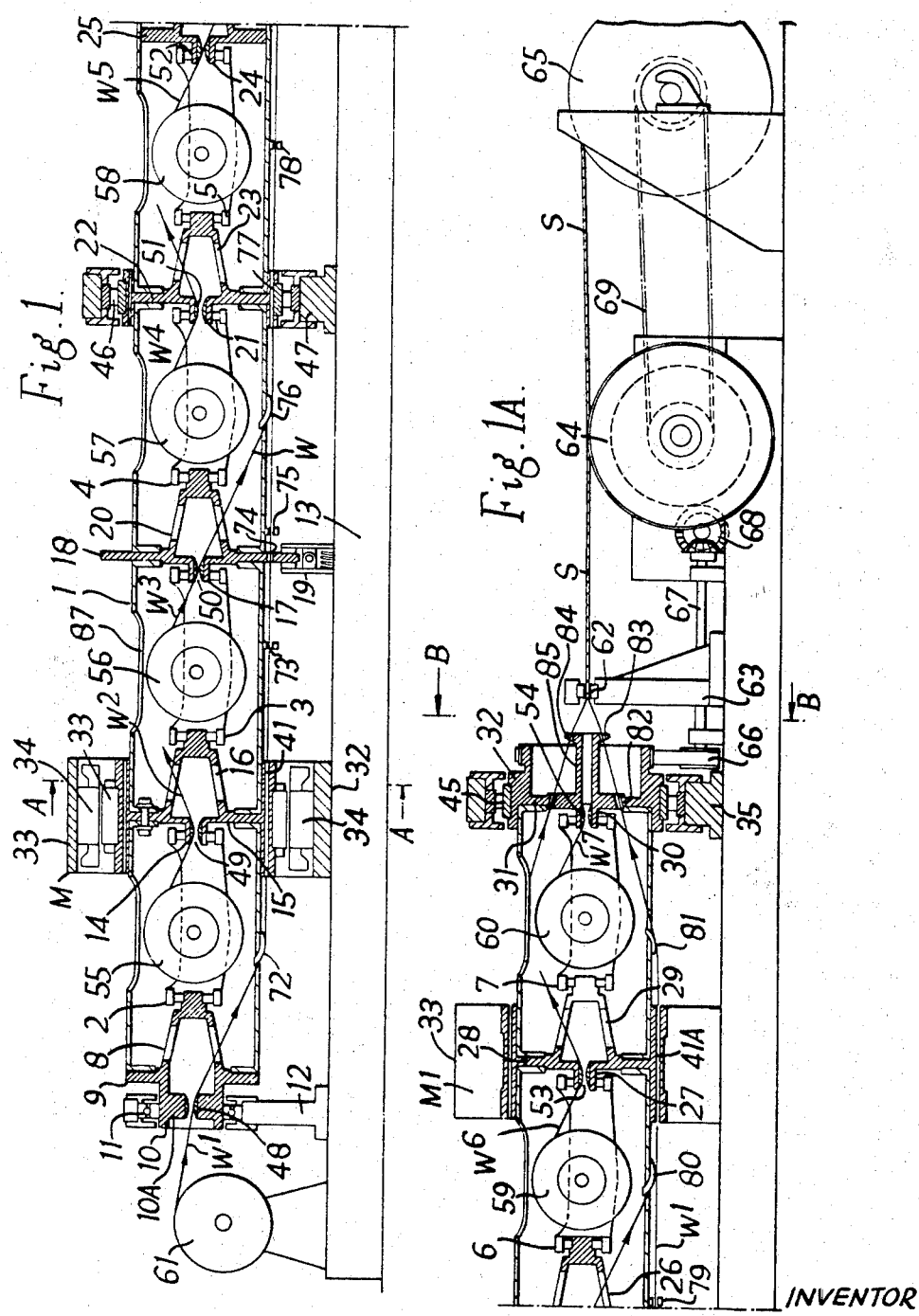
Figure 2:
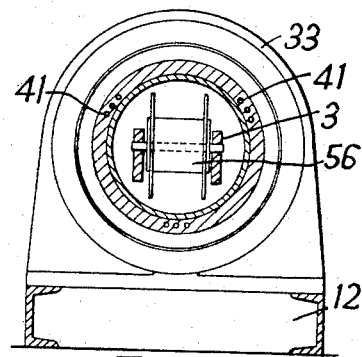
FIGURE 2 is a section on the line A—A in FIGURE 1.

Referring to the drawings:

The strander comprises a rotor 1 which consists of a tubular body of a solid steel tubing and the length of which is much greater than its diameter. The rotor encloses a plurality of axially-spaced, reel-supporting cradles which are turnably mounted in the rotor. It is essential that the cradles should be held stationary in relation to the ground. The normal way is to design each cradle with its centre of gravity below the centre line of its supporting bearings. As long as the torque due to gravity and inertia is greater than the turning torque due to friction in the bearings, the cradles will float inside the tubular body. Positive means using planetary gearing to each cradle can be employed, but these methods are complicated and expensive.

In this particular construction, there are six cradles numbered 2 to 7.

The left-hand cradle 2 is rotatably mounted at its left hand end on a hollow conical boss 8 of an end cap 9 which closes the left-hand end of the rotor 1 and which on its other side is provided with a hollow cylindrical boss 10, rotatably mounted in bearings 11 in a bracket 12 mounted on a base 13. The opposite end of the cradle 2 is turnably supported upon a hollow boss 14 integral with a web part or partition 15 which is arranged internally of and is connected to the rotor 1.

The cradle 3 is turnably mounted at its left-hand end on a hollow conical boss 16 which projects to the right from the web part 15, the opposite end of the cradle being turnably mounted upon a hollow boss 17 of a plate 18 which is connected to the rotor 1 and projects externally thereof to form the brake disc or plate of a mechanical parking brake 19 arranged on the base 13. The left-hand end of the cradle 4 is turnably mounted upon a hollow conical boss 20 which projects to the right from the plate 18, the right-hand end of the cradle being turnably mounted upon a hollow boss 21 projecting to the left from a web part or partition 22 arranged internally of and connected to the rotor 1. The left-hand end of the cradle 5 is turnably mounted upon a hollow conical boss 23 projecting to the right from the web part 22, while its right hand end is turnably mounted upon a hollow boss 24 projecting to the left from a flange part 25 fitted within and secured to the rotor 1.

The left-hand end of the cradle 6 is turnably mounted upon a hollow conical boss 26 projecting to the right from the flange part 25, the opposite end of the cradle being turnably mounted upon a hollow boss 27 projecting to the left from a web part 28 arranged inside, and connected to, the rotor 1. The left-hand end of the cradle 7 is turnably mounted upon a hollow conical boss 29 projecting to the right from the web part 28 while its right-hand end is turnably mounted upon a hollow boss 30 projecting to the left from the web 31 of a flanged end cap 32 fixed to the right-hand end of the rotor 1.

Figure 3:
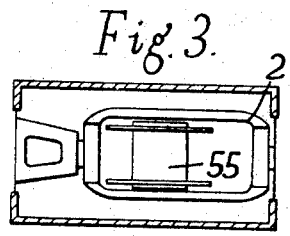
FIGURE 3 is a part sectional view of one of the cradles and reels.
Figure 5:
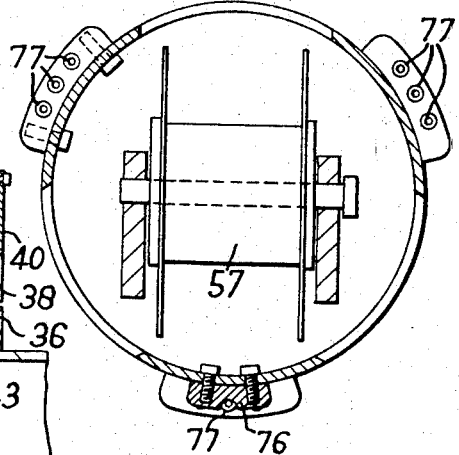
FIGURE 5 is a section on the line C—C in FIGURE 4.

As shown in FIGS. 1 and 3, each of the conical bosses 8, 16, 20, 23, 26 and 29 is formed with a plurality of elongated angularly-spaced openings and the rotor 1 is formed with a plurality of longitudinally-spaced openings, see also FIG. 5.

Figure 6:
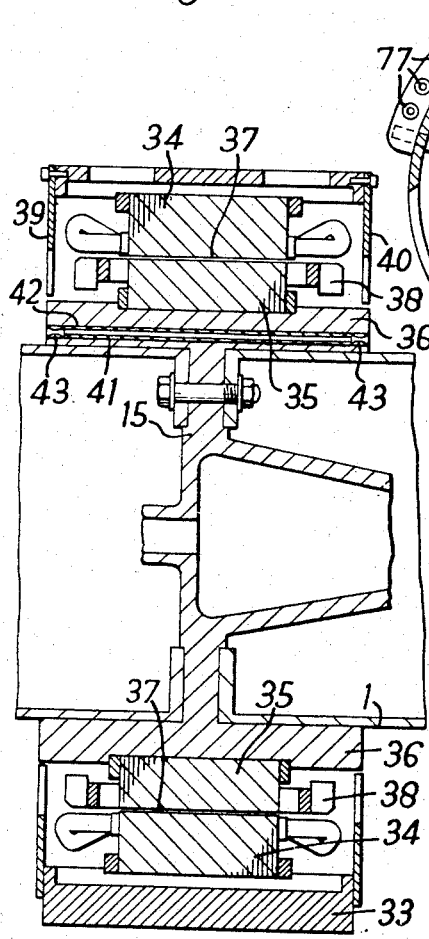
FIGURE 6 is a sectional view on a larger scale of one of the electric motors used for driving the rotor.
Figure 7:
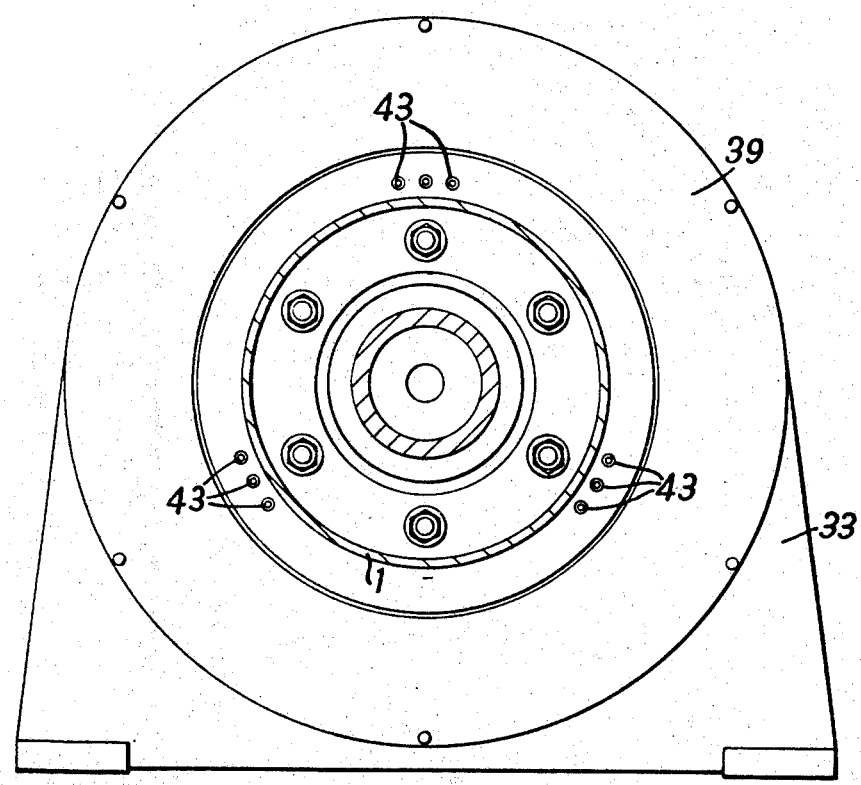
FIGURE 7 is an end view of the motor.

In this particular construction, see FIG. 1, the rotor is rotated by two longitudinally-spaced electric motors M and $M^1$ of which the left-hand motor M is shown in section in FIG. 6 and in end view in FIG. 7. The two motors are of like construction, each motor being a squirrel cage induction motor and comprising a motor housing 33 mounted upon the base 13 and enclosing stator winding 34 fixed in the housing and surrounding rotor windings 35 fixed in the annular flange 36 of the said web part or partition 15. In known manner, an air gap 37 is left between the rotor and stator windings and the rotor windings carry a cooling fan 38. The ends of the housing are closed by end plates 39 and 40, as shown in FIGS. 6 and 7. The flange 36 is provided with three angularly-spaced sets of holes 41 which themselves are spaced angularly in the flange and are coaxial with the rotor 1. Each hole 41 is fitted with a tube 42 provided at each end with a wire guide 43.

The stationary housing 33 of each motor has such fine adjustment as to allow accurate alignment with the rotor 34 since the bearing supports for the motor rotor and the tubular body 1 are separately mounted on the base 13.

The construction of the internal parts of each motor, whether A.C. or D.C. will be designed for the functions described below and for the size of the stranding machine involved. Unlike the conventional drive to tubular stranders which normally comprise a separate motor with a belt or a gear drive, and where the desired speed of the rotor can be obtained by mechanical speed reductions, it is necessary in the case of the motors used in the present strander to manufacture them and their controls to the desirable speed of the rotor. This speed control can be obtained by using D.C. power or by frequency regulation of A.C. power and the construction of the motor must suit this requirement.

It is desirable in the operation of a tubular strander to be able to accelerate reasonably evenly against a high inertia force, to maintain an even full speed and to be able to bring the strander to rest as quickly as possible consistent with the mechanical strength of the materials by the machine.

Either D.C. or A.C. motors may be used but because of its simple construction a squirrel-cage induction motor is preferred to a D.C. motor or an A.C. wound rotor induction motor.

The motors dispense with any form of gears and transmission, the strander body 1 connected to the rotors of the motors forming a common shaft joining the motors. The maximum speed can only be determined by the speed of the motors and, therefore, in this case by the synchronous speed of the squirrel cage induction motors.

On mains supply the speeds for A.C. motors are limited to the following:

|  | 50 Cycles, r.p.m | 60 Cycles, r.p.m. |
| --- | --- | --- |
| 2 pole | 3,000 | 3,600 |
| 4 pole | 1,500 | 1,800 |
| 6 pole | 1,000 | 1,200 |
| 8 pole | 750 | 900 |

For the tubular body 1 to be driven at a speed other than those obtainable on a mains supply, a frequency converter is employed and the motor and control equipment described is such a machine with a synchronous speed of 1480 r.p.m.

A 65 H.P., 4-pole squirrel cage induction motor drives 12-pole frequency converter connected to a 415 volt 3 phase 50 cycle supply, the motor being started by a conventional Star/Delta starter.

The resulting frequency is calculated as $$f = \frac{50 + PN}{3 \times 60}$$
$$= \frac{50 + 12 \times 1480}{2 \times 60} = 198 \text{ cycles}$$

In the machine now being described, two 25 H.P. 12-pole squirrel cage induction motors surround and drive the tubular body 1 of the machine. The synchronous speed of these two motors at 198 cycles is 1480 r.p.m. which is the desired speed of the tubular body. The synchronous speed at 50 cycles is 500 r.p.m. By changing over the supply to these motors from 198 cycles to 50 cycles the speed is rapidly reduced from 1480 r.p.m. by a regenerative braking effect.

Where tubular bodies 1 are required to run at a synchronous speed on a 50 cycle supply, identical results as those described using frequency changing equipment can be obtained by the use of change pole motors i.e. 4-pole—1500 r.p.m. to 12-pole—500 r.p.m.

Owing to the nature of the machine and its duty a low torque is required for the machine to move from rest and therefore it is permissible to start the machine with the motors connected in star and on the 415 volt supply.

For starting, the two 25 H.P. motors are connected in star across the 415 volt 3 phase 50 cycles supply and develop approximately 7% of full load torque and the machine turns very slowly. After a time delay, the motors are disconnected from the 415 volt 3 phase 50 cycle supply, and re-connected to the 650 volt 3 phase 198 cycle supply with their windings connected in delta. The machine now accelerates to full speed. (1480 r.p.m. synchronous.)

Once steady full speed running conditions have been attained, one of the 25 H.P. motors may be disconnected, one motor being sufficient to maintain running.

On a stranding machine with a longer tubular body 1 and carrying a greater number of wire-carrying and dispensing reels, more than two surrounding motors could be used, and in this case all motors would be used for acceleration and braking, and any selected number of motors used for running under stable conditions.

For inching, a foot-operated switch may be provided which connects the two 25 H.P. motors in star across the 415 volt 3 phase 50 cycles supply as for starting. When the switch is released the motors are isolated from the supply.

The two 25 H.P. motors are disconnected and the machine runs down freely to rest for normal stopping.

For a crash stop, the 25 H.P. motor or motors is or are disconnected from the supply from the frequency converter and both motors are connected across the mains supply. As the motors are revolving at a speed above synchronous for main supply, the rotor is rapidly braked to synchronous speed at 50 cycles i.e. 500 r.p.m.

A D.C. current is injected into the winding of the motors and the rotors are brought to rest.

The rotor 1, FIG. 1, is turnably supported at its left-hand end in the bearing 11 fitted in the said bracket 12 in which the said hollow boss 10 of the end cap 9 of the rotor is turnably supported. At its right-hand end the cylindrical part 32 of the end cap 31 of the rotor 1 is turnably supported in a bearing 45 carried in the bracket 35 and mounted in the annular space between the said part 32 and the bore of the bracket. The rotor 1 is also turnably supported intermediate of its ends in a bearing 46 fitted in the annular space between the rotor and bore of a bracket 47 fixed on the base 13.

The hollow boss 10 of the left-hand end cap 9 has an inwardly-projecting annular shoulder, 10A, FIG. 1, which is apertured centrally to receive a wire guide which is coaxial with the rotor 1.

The hollow bosses 14, 17, 21, 27 and 30 are provided respectively with wire guides 49, 50, 51, 52, 53 and 54, the bores of all of which are coaxial with the rotor 1.

Reels 55, 56, 57, 58, 59 and 60, FIG. 1 are turnably mounted respectively in the cradles 2, 3, 4, 5, 6 and 7.

Referring to FIG. 1, the strander comprises a rear input reel 61 at its left-hand end and at its right-hand end a forming point of the strand, rope or cable comprising a guide 62 which is coaxial with the rotor and is carried by a bracket 63 mounted on the base 13. A haul-off capstan 64 and a take-up drum 65 are also mounted upon the base on the right of the forming point 62. The capstan 64 is driven by the rotor 1 through a belt or chain drive 66, a shaft 67 and gearing 68 and the take-up drum 65 is driven from the capstan through a belt or chain drive 69.

The particular strander described above is shown to be stranding seven wires $W^1$, $W^2$, $W^3$, $W^4$, $W^5$, $W^6$, and $W^7$. The wire $W^1$ passes from the input reel 61 and through the guide 48 into the interior of the end cap 9, thence through one of said openings in the conical boss 8 and then to the exterior of the rotor 1 through one of the said openings in the rotor and over a curved guide 72 on the rotor. After leaving the wire guide 72 the wire passes through one of the wire guides 41, see also FIGS. 6 and 7, in the casing of the left-hand motor M and then successively through a wire guide 73 on the rotor, a wire guide 74 in the brake plate 18, a wire guide 75, a curved guide 76, one of a number of longitudinal guide tubes 77 in the bearing bracket 46, two longitudinally-spaced wire guides 78 and 79 on the rotor, over a curved guide 80, through one of the longitudinal guide tubes 41A in the casing of the motor $M^1$ over a curved guide 81 and thence into the interior of the rotor through one of the said openings in the latter. The wire $W^1$ then passes through one of a number of angularly-spaced guide holes 82 in the web of the right hand end cap 31 and thence through one of another set of angularly spaced guide holes 83 in the head 84 of a hollow boss 85 projecting outwardly from the web of the end cap 31. After leaving the guide hole 83 the wire passes to the forming point 62 and then with the other wires which are being stranded over the haul-off capstan 64 and the take-up reel 65.

The wire $W^3$ taken from the reel 56 passes through the wire guide 50 in the brake plate 18, through one of the said openings in the conical boss 20, through one of the said openings in the rotor, over a curved guide similar to the curved guide 76 and along the exterior of the rotor through one of the guide holes 77 in the bracket 46, through guides similar to the guides 78 and 79, over a curved guide similar to the curved guide 80, through one of the guide holes 41A in the casing of the motor $M^1$, over a curved guide similar to the curved guide 81 and into the interior of the rotor. The wire passes out of the rotor through one of the holes 82 in the end cap 31, thence through one of the holes 83 in the head 84 of the hollow boss 84 and then to the forming point 62.

After leaving the reel 58 the wire $W^5$ passes through the guide 52 in the plate 25, out of one of the said openings in the conical boss 26 and thence over a curved guide on the outside of the rotor similar to the guide 80 and through one of the guides 41A in the casing of the motor $M^1$ and over a curved guide similar to the guide 81 back into the interior of the rotor, through one of the holes 82 and one of the holes 83 to the forming point 62.

After leaving the reel 55 the wire $W^2$ passes through the wire guide 49 in the web 15 to the exterior of the rotor through one of the said openings in the boss 16, through one of the said holes in the rotor and along the exterior of the rotor through one of the guide holes 14 in the brake plate 18, through one of the guide holes 77 in the bearing bracket 47, through one of the guide holes 41A in the casing of the motor $M^1$ back into the rotor through one of the said openings in the latter, through one of the holes 82 in the end cap 31, through one of the holes 83 in the head 84 and thence to the forming point 62.

After leaving the reel 57, the wire W⁴ passes through the guide 51 in the web of the bearing bracket 47, through one of the openings in the boss 23, through one of the openings in the rotor, through one of the holes 41A in the casing of the motor M¹, back into the rotor, through one of the holes 82 in the end cap 31 and through one of the holes 83 in the head 84 and thence to the forming point 62.

After leaving the reel 59, the wire W⁶ passes through the guide 53 in the web part 28, through one of the openings in the conical boss 29, through one of the guide holes 82 in the end cap 31, through one of the guide holes 83 in the head 84 and thence to the forming point 62.

The wire W⁷ pulled from the reel 60 passes through the guide 54 in the end plate 31 and thence through the bore of the hollow boss 85 to the forming point 62.

It will be clear that because of the three angularly-spaced sets of three wire guides on the rotor and in the motors and the centre bearing these guides can accommodate nine wires, i.e., three sets of three down the length of the rotor.

The forming-point consists of the closing die 62 made from various materials to suit the particular wire to be stranded. The die may be a solid piece of material bored to suit the finished diameter of strand being produced. More usually, however, the die is made in halves, each half having a semi-circular groove down its length, the two halves when assembled making up a die as previously described.

The closing die is adjustable vertically and along the axis of the rotor for selection of the best forming point to suit the product.

The haul-off capstan 64 is shown in FIGURE 1 as a drum of fixed circumference over which the finished strand is wrapped. The drive should be positive between the tubular body 1 causing the twist, the haul-off capstan causing the forward linear motion of the strand. In this way, the pitch of the twists in the strand (known as the "lay length") is held constant throughout the product. A method of altering the ratio of forward movement to rotation of tubular body is usually incorporated, so that a range of lay lengths is available by selection.

Hauling off the strand may also be done by using double capstan drums, or by caterpillar or other means, but in each case the pulling speed must be constant in relation to the rotative speed of the tubular body.

The finished strand S is normally collected from the capstan onto a take-up drum 65 which may be driven from the capstan unit as shown or, alternatively, it may have an independent drive. In either case, a slipping device must be included to allow for the build up of strand in the drum from the barrel to the flange diameter.

During the operation of the machine, the cradles carrying the reels 4 are stationary in relation to the ground, and the rotor 1 revolves round them. Wire is fed from each reel as described above to the rotor end cap 31 and it is then passed to the forming-point 62. As shown in the drawings the rotor is a solid or hollow-walled steel tube formed with the said longitudinal angularly-spaced openings but the rotor may comprise a series of small rotors connected together by bars or similar structures or a series of small rotors connected together by a common drive. The rotor may be supported additionally or under-rollers. Although the routes of the wires are partially on the outside of the rotor 1, the routes may be in the inside.

I claim:

1. A strander for laying-up wires into strands comprising a rotatable tubular rotor and a plurality of wire-carrying pay-off reels turnably housed in said rotor, guide means associated with said rotor for guiding wire from said reels to a forming point and electric motor means for rotating said rotor, said electric motor means surrounding said rotor.

2. The strander of claim 1 wherein said electric motor means includes a plurality of spaced-apart electric motors that provide the acceleration, running and decelerating torque to said tubular rotor.

3. The strander of claim 1 wherein said electric motor means is driven by direct current whereby the speed of the tubular rotor can be directly regulated.

4. The stander of claim 1 wherein said electric motor means is driven by alternating current whereby the speed of said tubular rotor can be varied by frequency regulation of the electrical input to said electric motor means.

5. The strander of claim 1 wherein said tubular rotor has a discharge end for said wires to exit to the forming point, a driven capstan and take-up drum receiving the wire product from said forming point.

6. The stander of claim 1 wherein a portion of said guide means is located in the interior of said tubular rotor, said portion being coaxial with said tubular rotor, further guide means being parallel with the axis of said tubular rotor located adjacent the exterior of said tubular rotor.

7. The strander of claim 1 wherein said guide means comprises a plurality of angularly-spaced sets of wire guides located adjacent the exterior of said tubular rotor.

8. The strander of claim 1 wherein said electric motor means comprises a plurality of motors each having rotor windings which are carried by said tubular rotor on the exterior thereof and stator windings, which surround said rotor windings, said stator windings being arranged in the fixed housing of each of said motors.

9. The strander of claim 1 wherein said electric motor means comprises a plurality of squirrel-cage motors.

10. The strander of claim 9 wherein the rotor of each motor is provided with angularly-spaced sets of wire guides, each set comprising angularly-spaced guides which are located exteriorly of said tubular rotor and which extend generally parallel to the axis of rotation of said tubular rotor.

11. The strander of claim 1 wherein said tubular rotor is journaled in end bearings and in bearings intermediate thereto.

12. The strander of claim 1 wherein said tubular rotor has an input end and an output end, said input and output ends having wire guide means.

13. The strander of claim 1 wherein a mechanical brake is associated with said tubular rotor, said brake comprising a brake disc mounted on said rotor.

14. The strander of claim 13 wherein said disc has a plurality of angularly-spaced wire guides which are generally parallel with the axis of said tubular rotor.

15. A strander of claim 1 for laying-up wires into strands comprising a rotatable tubular rotor and a plurality of wire-carrying pay-off reels turnably housed in said rotor, said reels being mounted on cradles, said cradles being turnably supported within said tubular rotor, the center of gravity of said cradles being below the axis of rotation of said tubular rotor whereby said reels are prevented from rotating during operation of said strander.

References Cited
UNITED STATES PATENTS

| | | | |
|---|---|---|---|
| 2,534,696 | 12/1950 | Bruestle | 57—58.3 XR |
| 2,873,569 | 2/1959 | Schinke et al. | 57—100 XR |
| 2,921,428 | 1/1960 | Lütcke et al. | 57—58.3 |
| 2,957,302 | 10/1960 | Lenk et al. | 57—77.3 |
| 3,055,164 | 9/1962 | Lütcke | 57—58.34 |
| 3,271,942 | 9/1966 | Griffin | 57—58.32 |

FOREIGN PATENTS

| | | |
|---|---|---|
| 923,093 | 4/1963 | Great Britain. |

FRANK J. COHEN, *Primary Examiner.*

WERNER H. SCHROEDER, *Assistant Examiner.*